US012511418B2

(12) United States Patent
Agrawal et al.

(10) Patent No.: US 12,511,418 B2
(45) Date of Patent: Dec. 30, 2025

(54) FACILITATING SECURED ACCESS TO PROTECTED RESOURCES HOSTED IN ONE CLOUD FROM ANOTHER CLOUD

(71) Applicants: Oracle International Corporation, Redwood Shores, CA (US); Indian Institute of Technology Roorkee, Roorkee (IN)

(72) Inventors: Manish Agrawal, Bangalore (IN); Sandeep Kumar, Roorkee (IN); Yogesh Kumar, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 275 days.

(21) Appl. No.: 18/296,401

(22) Filed: Apr. 6, 2023

(65) Prior Publication Data

US 2024/0338471 A1 Oct. 10, 2024

(51) Int. Cl.
*G06F 21/62* (2013.01)
*G06F 21/60* (2013.01)

(52) U.S. Cl.
CPC ........ *G06F 21/6218* (2013.01); *G06F 21/602* (2013.01); *G06F 2221/2137* (2013.01)

(58) Field of Classification Search
CPC ............... G06F 21/602; G06F 21/6218; G06F 2221/2137
See application file for complete search history.

(56) References Cited

U.S. PATENT DOCUMENTS

| | | | | |
|---|---|---|---|---|
| 9,116,888 | B1* | 8/2015 | Wang | H04L 63/0428 |
| 10,462,210 | B2* | 10/2019 | Mayer | G06F 9/5072 |
| 10,931,453 | B2* | 2/2021 | Diaz | H04L 9/006 |
| 11,303,625 | B2* | 4/2022 | Hu | G06F 21/30 |
| 11,403,412 | B2* | 8/2022 | Huang | H04L 63/062 |
| 12,177,185 | B1* | 12/2024 | Ryland | H04L 63/102 |
| 2016/0156616 | A1* | 6/2016 | Chen | H04L 67/1097 726/5 |
| 2017/0163635 | A1* | 6/2017 | Hirata | G06F 21/41 |
| 2019/0149592 | A1* | 5/2019 | Lander | H04L 67/56 726/4 |
| 2019/0215319 | A1* | 7/2019 | Hu | G06F 21/30 |
| 2019/0372960 | A1* | 12/2019 | Huang | H04L 63/061 |
| 2020/0296085 | A1* | 9/2020 | Deshpande | H04L 67/53 |
| 2020/0314075 | A1* | 10/2020 | Barajas Gonzalez | G06F 21/6218 |

(Continued)

*Primary Examiner* — Gary S Gracia
(74) *Attorney, Agent, or Firm* — IPHORIZONS PLLC; Narendra Reddy Thappeta

(57) ABSTRACT

An aspect of the present disclosure facilitates secured access to protected resources. In one embodiment, a system (e.g., identity provider) receives, from an application service operating on a cloud node of a first cloud, a token request to access a protected resource hosted on a second cloud. The system generates a cloud web token containing a resource identifier of the protected resource, an application identifier associated with the application service and a node identifier of the cloud node. The system sends the cloud web token to the cloud node. Upon receiving, from the application service, an access request containing the resource identifier and the cloud web token, the system checks whether the cloud web token contained in the access request is valid. The system allows access to the protected resource if the cloud web token is determined to be valid, and denies access to the protected resource otherwise.

20 Claims, 14 Drawing Sheets

(56) References Cited

U.S. PATENT DOCUMENTS

| | | | |
|---|---|---|---|
| 2021/0194847 A1* | 6/2021 | Gu | G06F 9/5072 |
| 2021/0377276 A1* | 12/2021 | Dasari | G06F 21/6218 |
| 2022/0123922 A1* | 4/2022 | Thorpe | H04L 63/108 |
| 2022/0229928 A1* | 7/2022 | Shachar | G06F 21/31 |
| 2023/0007474 A1* | 1/2023 | Ni | H04L 63/029 |
| 2023/0127695 A1* | 4/2023 | Woo | H04L 63/108 |
| | | | 726/4 |
| 2023/0176753 A1* | 6/2023 | Yang | G06F 3/0622 |
| | | | 711/164 |
| 2023/0353362 A1* | 11/2023 | Dyer | H04L 63/0861 |
| 2023/0370265 A1* | 11/2023 | Ma | H04L 9/0894 |
| 2023/0412582 A1* | 12/2023 | Price | H04L 9/0894 |
| 2024/0064137 A1* | 2/2024 | Sanghvi | H04L 63/0823 |
| 2024/0303358 A1* | 9/2024 | Kulkarni | G06F 21/6218 |
| 2024/0338471 A1* | 10/2024 | Agrawal | G06F 21/6218 |
| 2024/0419506 A1* | 12/2024 | Mohana Narayanamurthy | |
| | | | G06F 9/505 |

\* cited by examiner

| Cloud web token | Resource URL |
|---|---|
| B405A15857885F01C801DEA7F727DE1B | http://brass.activity.com/arch.php |
| 52489A2BE682D3082D3398FA877E44EB | https://www.de12.com/?afternoon=account&beds=addition |
| 8C72A5483EBD8658A7B9991B695F769E | https://github.com/bendrucker/ |
| B43FB390673C210233FA42B29E4EDC59 | https://ten.net/#hose |
| 695997E7EC23F5097E6B57C6F90F62B6 | http://www.zipd.org/head |

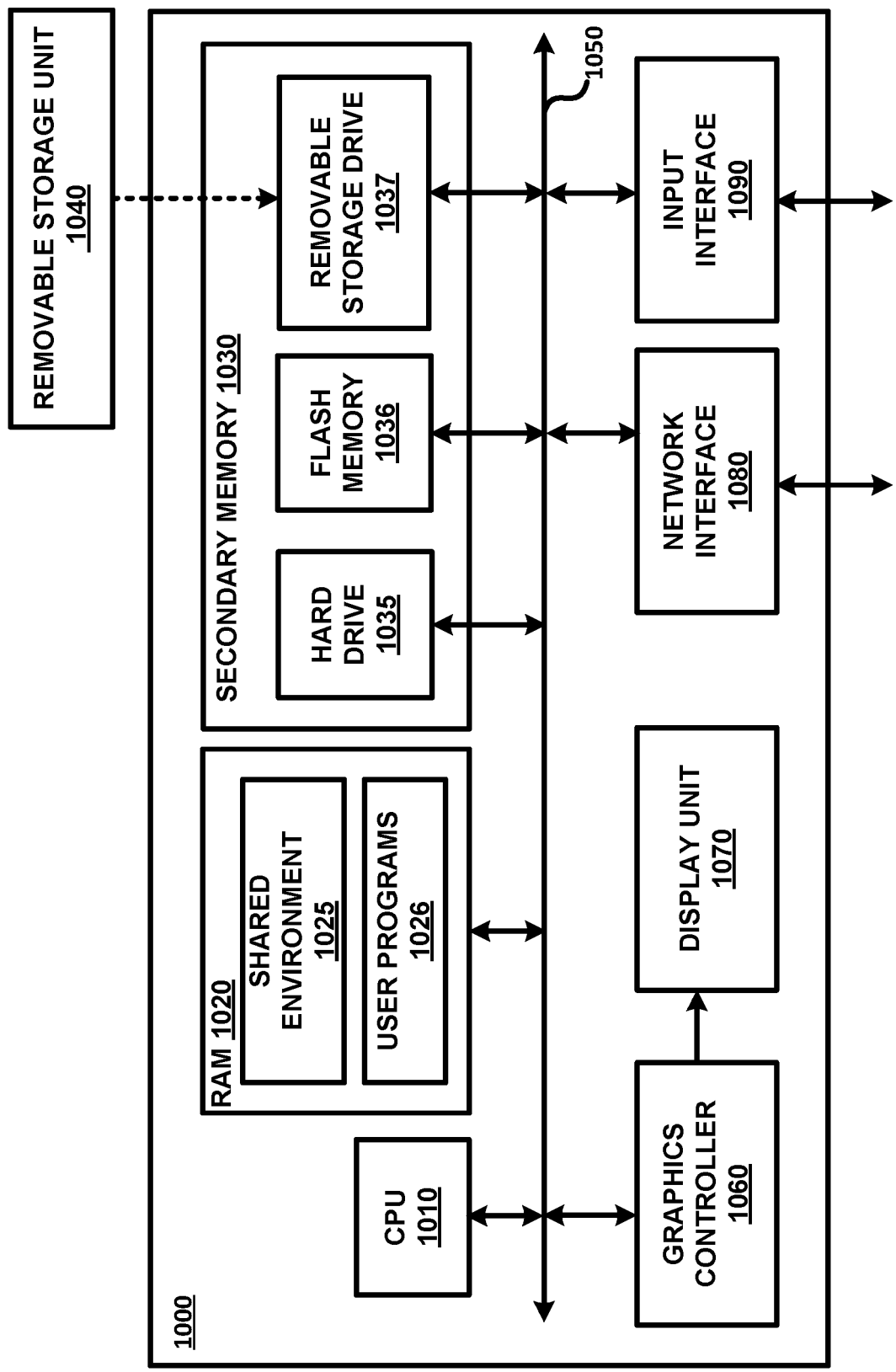

FACILITATING SECURED ACCESS TO PROTECTED RESOURCES HOSTED IN ONE CLOUD FROM ANOTHER CLOUD

BACKGROUND OF THE DISCLOSURE

Technical Field

The present disclosure relates to cloud computing and more specifically to facilitating secured access to protected resources hosted in one cloud from another cloud.

Related Art

Cloud refers to a virtual infrastructure provided on a collection of processing systems, connectivity infrastructure, data storages, etc. The virtual infrastructure contains computing components (e.g., virtual machines, operating systems), storage components (e.g., database servers, file systems) and network components (e.g., switches and routers) connecting the computing and storage components, in addition to providing external connectivity, based on the collection.

A customer/owner (also known as tenant) of a cloud may deploy desired application/data services on the components provided as a part of their cloud(s), with the services capable of processing requests received from other clouds or end user systems. The deployed application/data services may maintain data in the storage components as a part of processing the requests.

Protected resources refer to resources (computing components, storage components, services, data, etc.) of the cloud whose access is desired to be controlled by a tenant. For example, the tenant may allow/restrict the access to a resource to only a specific set of application services/users (accessor, in general). Protected resources are in contrast to public resources that can be generally accessed by any accessor (without being controlled by the tenant).

Secured access to a protected resource commonly entails authenticating (e.g., based on password, digital keys, etc.) the identity of an accessor seeking access to the protected resource and also checking whether the accessor is authorized (e.g., based on prior configuration) to access the protected resource.

There are often situations in which protected resources are hosted on one cloud, while an accessor (e.g., application service) is hosted on another cloud. The two clouds may be owned by two different tenants, with the clouds being hosted either in different cloud infrastructures (e.g., Amazon Web Services (AWS), Google Cloud Platform (GCP), etc.) or in the same cloud infrastructure.

Aspects of the present disclosure are directed to facilitating secured access to protected resources in such scenarios where the protected resources are hosted is one cloud, and the access is from another cloud.

BRIEF DESCRIPTION OF THE DRAWINGS

Example embodiments of the present disclosure will be described with reference to the accompanying drawings briefly described below.

FIG. 10 is a block diagram illustrating the details of a digital processing system in which various aspects of the present disclosure are operative by execution of appropriate executable modules.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Overview

Figure 1:
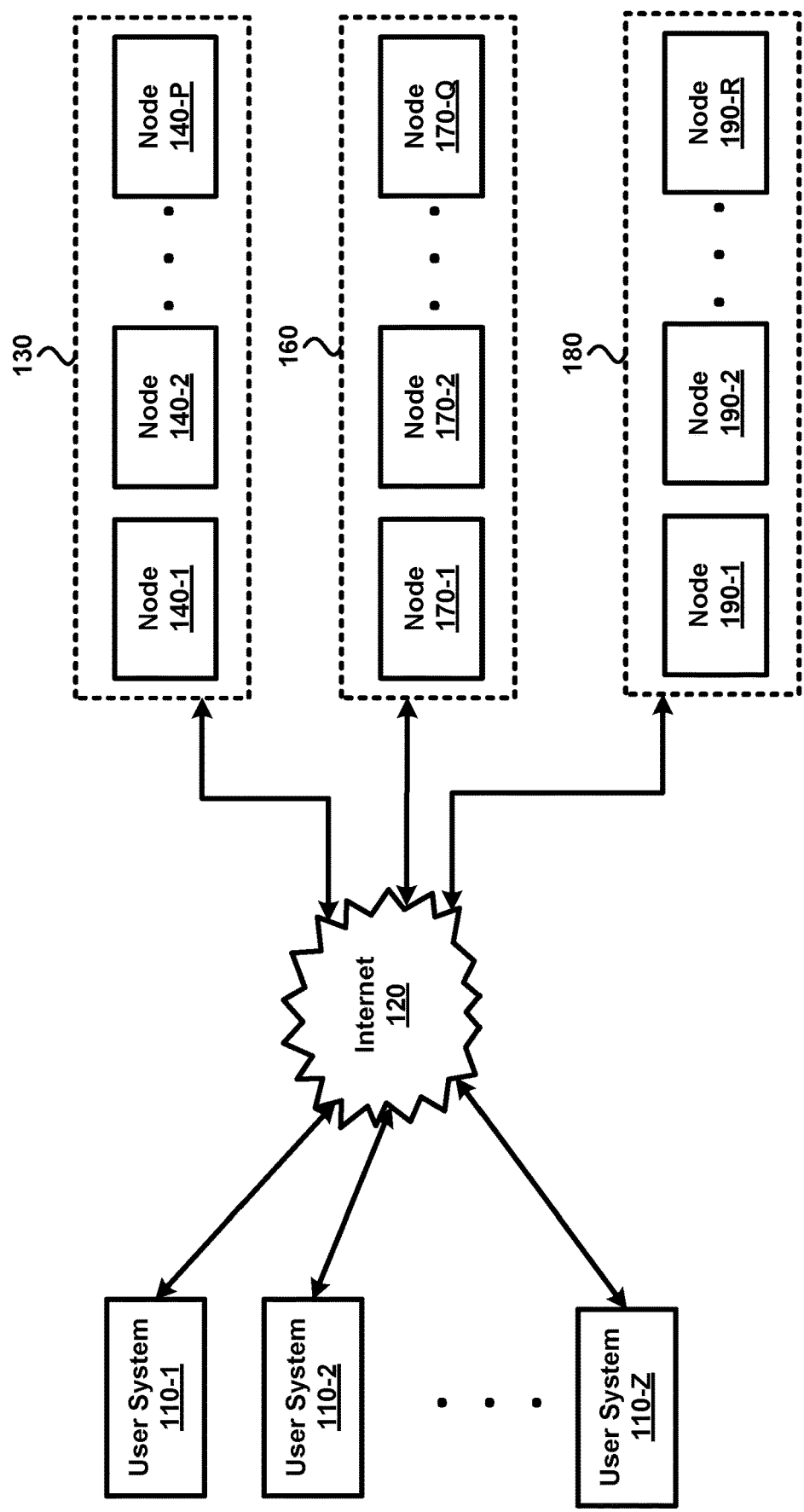
FIG. 1 is a block diagram illustrating an example environment in which several aspects of the present disclosure can be implemented.

An aspect of the present disclosure facilitates secured access to protected resources. In one embodiment, a system (e.g., identity provider) receives, from an application service operating on a cloud node of a first cloud, a token request to access a protected resource hosted on a second cloud. The system generates a cloud web token containing a resource identifier of the protected resource, an application identifier associated with the application service and a node identifier of the cloud node. The system sends the cloud web token to the cloud node as a response to the token request. Upon receiving, from the application service, an access request to access the protected resource, the access request containing the resource identifier and the cloud web token, the system checks whether the cloud web token contained in the access request is valid. The system allows access to the protected resource if the cloud web token is determined to be valid, and denies access to the protected resource otherwise.

In one embodiment, the resource identifier is an URL (Uniform resource locator) of the protected resource and the node identifier is a public IP (Internet Protocol) address of the cloud node.

According to another aspect of the present disclosure, the system (noted above) stores in a cache, after the generating, the cloud web token associated with the resource identifier. As such, the system performs the checking noted above by retrieving from the cache, a stored cloud web token associated with the resource identifier contained in the access request, comparing the cloud web token contained in the access request with the stored cloud web token and determining that the cloud web token is valid if the cloud web token matches the stored cloud web token and is not valid otherwise.

According to one more aspect of the present disclosure, the access request (noted above) is received at a first time instance by the system. The system compares the cloud web token with a current token valid for a current duration and a previous token valid for a previous duration prior to the current duration. The system determines that the cloud web token is valid (a) if the cloud web token matches the current token or (b) if the cloud web token matches the previous token and if the cloud web token has expired within a bonus interval prior to the first time instance.

According to yet another aspect of the present disclosure, the system calculates a time stamp counter based on a current time and a fixed duration and includes the time stamp counter as part of each cloud web token to indicate that the cloud web token is valid up to a time instance specified by the time stamp counter. The system (noted above) then determines that the cloud web token is valid if a timestamp counter contained in the cloud web token also matches the time stamp counter calculated for the first time instance and is not valid otherwise.

According to an aspect of the present disclosure, a cloud agent is installed in the cloud node, where the system receives the token request from the cloud agent on behalf of the application service. The system registers a secret key associated with the cloud agent, and includes the secret key as part of the cloud web token. The system (noted above) then determines that the cloud web token is valid if a secret key contained in the cloud web token also matches the secret key associated with the cloud agent and is not valid otherwise.

According to another aspect of the present disclosure, the system (noted above) identifies that the secret key associated with the cloud agent is to be modified. The system updates the secret key with a new secret key for the cloud agent and communicates the new secret key to the cloud agent installed in the cloud node.

According to one more aspect of the present disclosure, the receiving the token request, the generating, and the sending (note above) are performed in an identity access provider implemented external to the second cloud. The checking is performed by sending to the identity access provider, a validation request containing the cloud web token and receiving, as a response to the validation request, data indicating whether the cloud web token is valid or not valid.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

FIG. 1 is a block diagram illustrating an example environment in which several aspects of the present disclosure can be implemented. The block diagram is shown containing user systems 110-1 through 110-Z (Z representing any natural number), Internet 120, and computing infrastructures 130, 160 and 180. Computing infrastructure 130 in turn is shown containing nodes 140-1 through 140-P (P representing any natural number). Computing infrastructure 160 in turn is shown containing nodes 170-1 through 170-Q (Q representing any natural number). Computing infrastructure 180 in turn is shown containing nodes 190-1 through 190-R (R representing any natural number). The user systems and nodes are collectively referred to by 110, 140, 170 and 190 respectively.

Merely for illustration, only representative number/type of systems are shown in FIG. 1. Many environments often contain many more systems, both in number and type, depending on the purpose for which the environment is designed. Each block of FIG. 1 is described below in further detail.

Each of computing infrastructures 130, 160 and 180 is a collection of physical processing nodes (140, 170 and 190), connectivity infrastructure, data storages, administration systems, etc., which are engineered to together host application/data services. For illustration, the aspects of the present disclosure are described below with respect to application services, though the same aspects can be applied to data services as well as will be apparent to one skilled in the relevant arts by reading the disclosure herein.

Computing infrastructure 130/160/180 may be a cloud infrastructure such as Amazon Web Services (AWS) available from Amazon.com, Inc., Google Cloud Platform (GCP) available from Google LLC, etc. that provides a virtual computing infrastructure for various customers, with the scale of such computing infrastructure being specified often on demand. Alternatively, computing infrastructures 130/160/180 may also correspond to an enterprise system (or a part thereof) on the premises of the customers (and accordingly referred to as "On-prem" infrastructure). Computing infrastructures 130/160/180 may also be a "hybrid" infrastructure containing some nodes of a cloud infrastructure and other nodes of an on-prem enterprise system.

All the systems of each computing infrastructures 130/160/180 are assumed to be connected via a corresponding intranet (not shown). Internet 120 extends the connectivity of these (and other systems of the computing infrastructures) with external systems such as user systems 110. Each of the intranets and Internet 120 may be implemented using protocols such as Transmission Control Protocol (TCP) and/or Internet Protocol (IP), well known in the relevant arts.

In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered. An IP packet is said to be directed to a target system when the destination IP address of the packet is set to the IP address of the target system, such that the packet is eventually delivered to the target system by Internet 120 and respective intranet. When the packet contains content such as port numbers, which specifies a target application, the packet may be said to be directed to such application as well.

Each of user systems 110 represents a system such as a personal computer, workstation, mobile device, computing tablet etc., used by users to generate (user) requests directed to application services executing in computing infrastructures 130/160/180. A user request refers to a specific technical request (for example, Universal Resource Locator (URL) call) sent to a server system from an external system (here, user system) over Internet 120, typically in response to a user interaction at user systems 110. The user requests may be generated by users using appropriate user interfaces (e.g., web pages provided by an application executing in a node, a native user interface provided by a portion of an application downloaded from a node, etc.).

In general, a user system requests a application service for performing desired tasks and receives the corresponding responses (e.g., web pages) containing the results of performance of the requested tasks. The web pages/responses may then be presented to a user by a client application such as the browser. Each user request is sent in the form of an IP packet directed to the desired system or application service, with the IP packet including data identifying the desired tasks in the payload portion.

Some of nodes 140/170/190 may be implemented as corresponding data stores. Each data store represents a non-volatile (persistent) storage facilitating storage and retrieval of data by application services executing in the other systems/nodes of computing infrastructures 130/160/180. Each data store may be implemented as a corresponding database server using relational database technologies and accordingly provide storage and retrieval of data using structured queries such as SQL (Structured Query Language). Alternatively, each data store may be implemented as a corresponding file server providing storage and retrieval of data in the form of files organized as one or more directories, as is well known in the relevant arts.

Some of the nodes 140/170/190 may be implemented as corresponding server systems. Each server system represents a server, such as a web/application server, constituted of appropriate hardware, executing application services capable of performing one or more tasks. The tasks may be specified as part of user requests received from user systems 110 or node requests received from nodes of same/other cloud infrastructures. A server system, in general, receives a task request and performs the tasks requested in the task request. A server system may use data stored internally (for example, in a non-volatile storage/hard disk within the server system), external data (e.g., maintained in a data store) and/or data received from external sources (e.g., received from a user) in performing the requested tasks. The server system then sends the result of performance of the tasks to the requesting user system (one of 110) or node (one of 140/170/190) as a corresponding response to the task request. The results may be accompanied by specific user interfaces (e.g., web pages) for displaying the results to a requesting user.

In one embodiment, each customer/tenant is provided with a corresponding virtual computing infrastructure (referred to as a "cloud") hosted on nodes 140/170/190 of cloud infrastructures 130/160/180. The manner in which clouds may be hosted in computing infrastructures is described below with examples.

3. Hosting Clouds in Computing Infrastructures

In one embodiment, virtual machines (VMs) form the basis for deployment of various user/enterprise applications in the nodes of computing infrastructures 130/160/180. As is well known, a virtual machine may be viewed as a container in which other execution entities are executed. A node/server system can typically host multiple virtual machines, and the virtual machines provide a view of a complete machine (computer system) to the user applications executing in the virtual machine. The manner in which multiple clouds are provisioned in cloud infrastructures 130/160/180 using VMs is described below with examples.

Figure 2A:
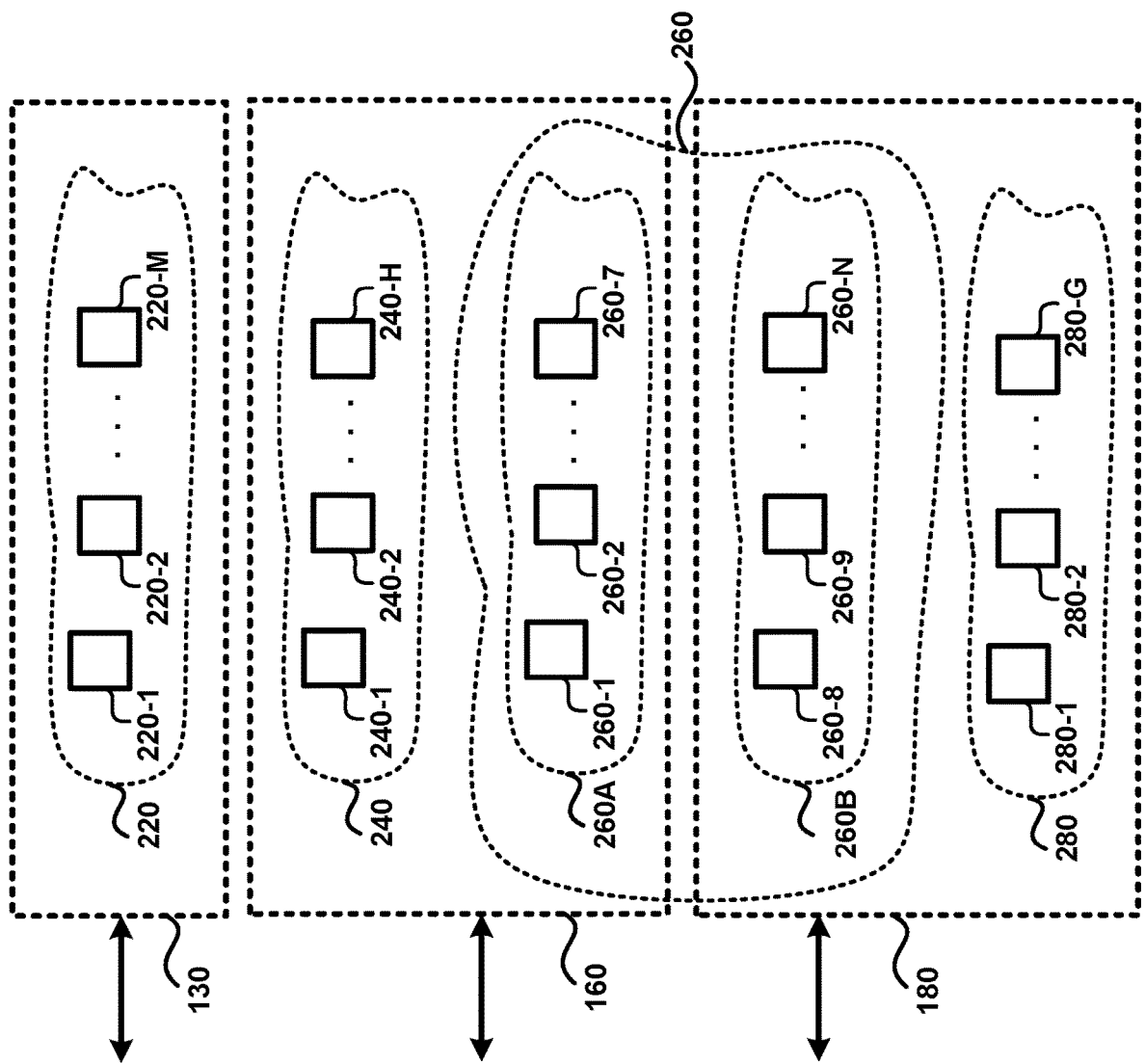
FIG. 2A illustrates the manner in which clouds are hosted in computing infrastructures in one embodiment.

FIG. 2A illustrates the manner in which clouds are hosted in computing infrastructures in one embodiment. Specifically, the Figure illustrates the manner in which clouds 220, 240, 260, and 280 are deployed in the nodes of computing infrastructures 130/160/180 using VMs. Only a sample set of clouds is shown in FIG. 2A for illustration, though many environments often host a large number (100+) clouds across multiple computing infrastructures as is well known.

Cloud 220 is shown containing VMs 220-1 through 220-M (M representing any natural number) that may be provisioned on nodes 140 of cloud infrastructure 130. Cloud 240 is shown containing VMs 240-1 through 240-H (H representing any natural number) that may be provisioned on nodes 170 of cloud infrastructure 160, while cloud 280 is shown containing VMs 280-1 through 280-G (G representing any natural number) that may be provisioned on nodes 190 of cloud infrastructure 180.

Cloud 260 is shown containing VMs 260-1 through 260-N (N representing any natural number) that may be provisioned on nodes 170 of cloud infrastructure 160 and nodes 190 of cloud infrastructure 180. Specifically, groups 260A and 260B respectively represents the set of VMs provisioned in cloud infrastructure 160 and cloud infrastructure 180.

It may be appreciated that if any of cloud infrastructure 160 or 180 is an on-prem infrastructure, cloud 260 is referred to as a "hybrid" cloud. Hybrid clouds are distinguished from other clouds that operate based on VMs provisioned on one or more cloud infrastructures. For illustration, it is assumed that each cloud (220, 240, 260 and 280) is owned by a corresponding customer/tenant.

A customer owning a cloud (e.g., 220) typically specifies the desired number of VMs to be part of the cloud. The customer may thereafter host desired application services/data services (hereinafter referred to as "services") on (the VMs in) their cloud(s), which are capable of processing task requests-user requests received from user systems 110 and node requests received from nodes/VMs of same/other clouds. Examples of such application services include, but are not limited to, data processing (e.g., batch processing, stream processing, extract-transform-load (ETL)) applications, Internet of things (IoT) services, mobile applications, and web applications. The services may generate and maintain data in one or more nodes (for example, nodes implemented as data stores) as part of processing the user requests.

Thus, a tenant may have a large number of resources in the cloud and may desire to control the access to some of these resources ("protected resources"), for example, allow/restrict the access to a resource to only a specific set of users/application services. Examples of protected resources are, but not limited to, web servers, application servers, database servers, file servers, databases, virtual machines (VMs) hosted on the nodes, application services, data services, data maintained in servers, etc. The manner in which a protected resource may be accessed is described below with examples.

Figure 2B:
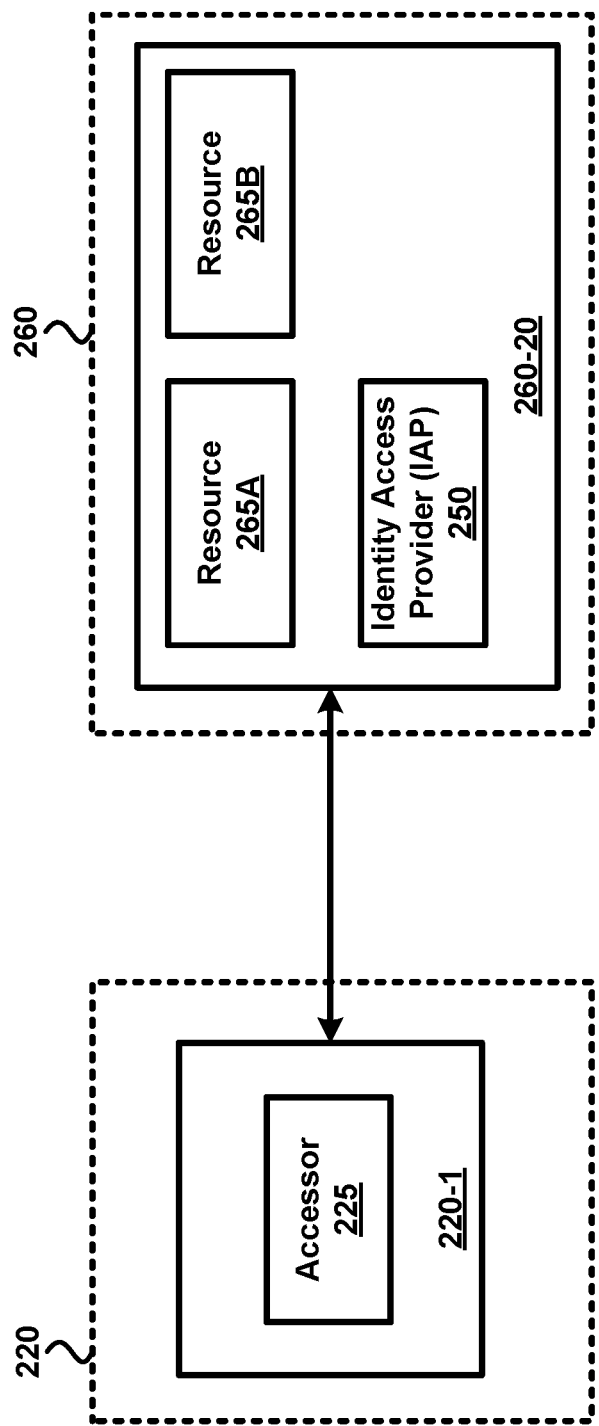
FIG. 2B is a block diagram illustrating the manner in which a protected resource is accessed in one embodiment.

FIG. 2B is a block diagram illustrating the manner in which a protected resource is accessed in one embodiment. The block diagram is shown containing accessor 225, resources 265A and 265B and identity and access provider (IAP) 250. The various blocks are shown deployed in different nodes of clouds 220 and 260 for illustration. Aspects of the present disclosure are applicable when these blocks are hosted on other clouds (e.g., 240) or other types of clouds (e.g., "hybrid" noted above), as will be apparent to one skilled in the relevant art by reading the disclosure herein. Each block of FIG. 2B is described below in further detail.

Accessor 225 operating on VM 220-1 in cloud 220 represents an application service (e.g., web server, application server, etc.) that desires/requires to access resources 265A-265B hosted on VM 260-20 in cloud 260 (a different cloud). Accessor 225 may have such a requirement as part of processing user requests received from user systems 110. In alternative embodiments, accessor 225 may be users such as an administrator, SREs (site reliability engineers), etc. Each of resources 265A-265B hosted on VM 260-20 in cloud 260 represents a corresponding protected resource.

It may be appreciated that the access to a protected resource (265A) is required to be provided in a secured manner, that is, after successful authentication and authorization of accessor 225. In addition, it may be desirable that such secured access should ideally be impervious to any network-based attacks such as Man-in-Middle attacks, relay attacks, replay attacks, etc. well known in the relevant arts. Furthermore, such secured access should be allowed for all legitimate requests (e.g., those received from accessor 225) without any delays, for example, caused due to additional requests for authentication and authorization.

Identity and access provider (IAP) 250, provided according to several aspects of the present disclosure, facilitates secured access to protected resources (265A-265B) hosted in one cloud (260) from another cloud (220). Though shown operating on VM 260-20 in cloud 260, in alternative embodiments, IAP 250 may be operating on other nodes of the same cloud (260) or on other clouds (e.g., 240, 280). The manner in which IAP 250 facilitates secured access to protected resources is described below with examples.

4. Facilitating Secured Access to Protected Resources

Figure 3:
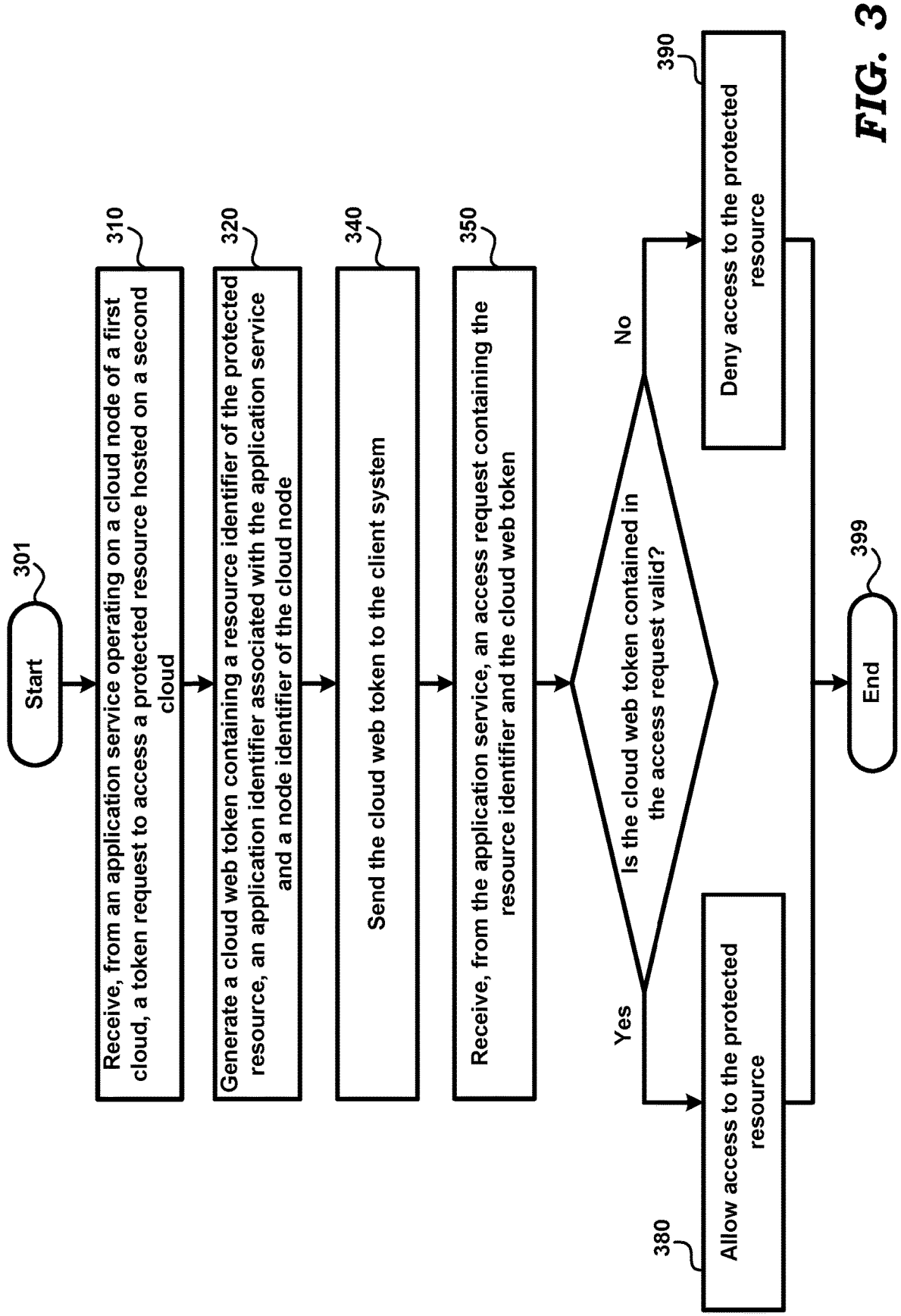
FIG. 3 is a flow chart illustrating the manner in which secured access to protected resources hosted in one cloud from another cloud is facilitated according to aspects of the present disclosure.

FIG. 3 is a flow chart illustrating the manner in which secured access to protected resources (265A-265B) hosted in one cloud (260) from another cloud (220) is facilitated according to aspects of the present disclosure. The flowchart is described with respect to the systems of FIGS. 1, 2A and 2B, in particular IAP 250, merely for illustration. However, many of the features can be implemented in other environments also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 301, in which control immediately passes to step 310.

In step 310, IAP 250 receives, from an application service (such as accessor 225) operating on a cloud node (VM 220-1 or the underlying node such as node 140-4) of a first cloud (220), a token request to access a protected resource (e.g., 265A) hosted on a second cloud (260).

In step 320, IAP 250 generates a cloud web token containing a resource identifier of the protected resource, an application identifier associated with the application service and a node identifier of the requesting cloud node. The cloud web token is typically in the form of a text/string of characters of a pre-defined length, with different portions of the text indicating the different identifiers noted above. Alternatively, the cloud web token may be in the form of a binary sequence of bytes of fixed/variable length.

It should be noted that the generation of the cloud web token is performed after appropriate authentication and authorization of the application service and cloud node with respect to the requested protected request. The token request may include any additional data (e.g., user name, password, digital key, etc.) required for such authentication and authorization.

In one embodiment, the resource identifier is an URL (Uniform resource locator) of the protected resource (265A) and the node identifier is a public IP address of the cloud node (node 140-4 in the example noted above).

In step 340, IAP 250 sends the (generated) cloud web token to the requesting cloud node as a response to the token request. According to an aspect, after generating and prior to sending, IAP 250 stores in a cache, the cloud web token associated with the resource identifier.

In step 350, IAP 250 receives, from the application service (accessor 225), an access request to access the protected resource (265A), the access request containing the resource identifier and the cloud web token provided in step 340. It may be appreciated that the access request may be received at any time instance after step 340. The access request may itself be implicit/inherent to a task request or may be explicitly received as a separate request prior to a task request.

In step 370, IAP 250 checks whether the cloud web token contained in the access request is valid. The validity of the cloud web token may be ascertained in any known way. According to an aspect, IAP 250 retrieves from the cache (noted above), a stored cloud web token associated with the resource identifier contained in the access request. IAP 250 then compares the cloud web token contained in the access request with the stored cloud web token and determines that the cloud web token is valid if the cloud web token matches the stored cloud web token and is not valid otherwise.

A match is determined to be present if all the characters/bytes in the text/binary sequence forming the cloud web token is equal to (same as) the corresponding characters/bytes forming the stored cloud web token. Control passes to step 380 if the cloud web token is determined to be valid and to step 390 otherwise (not valid).

In step 380, IAP 250 allows access to the protected resource (265A) to the requesting application (accessor 225). The term "allow" may entail performing one or more actions such as sending the protected resource to requesting application (for example, when the protected resource is data), executing the protected resource (for example, when the protected resource is a service), performing tasks (insert, update, delete, etc.) based on other data contained in the access request, etc. as will be apparent to one skilled in the art. Control passes to step 399, where the flowchart ends.

In step 390, IAP 250 denies access to the protected resource (265A) to the requesting application (accessor 225). The term "deny" may entail not allowing any of the one or more actions noted above. Control passes to step 299, where the flowchart ends.

Thus, IAP 150 facilitates secured access to a protected resource (265A) hosted in one cloud (260) from another cloud (220). It should be noted that as the cloud web token includes the resource identifier, a different cloud web token would be generated when the token request is for another protected resource (e.g., 265B). In addition, as the cloud web token includes both an application identifier and node identifier, a different cloud web token would be generated if the token request was received from a different application (another application other than 225) or from a different cloud node (e.g., VM 220-5, node 140-2, node 170-3, etc.)

It may be appreciated that since a different cloud web token is generated for each combination of resource identifier, application identifier and node identifier, the use of such cloud web tokens provides a more secured access to protected resources. It is also noted that the compromise one cloud web token affects only the corresponding resource and may not affect secured access to other resources. The manner in which IAP 250 provides several aspects of the present disclosure according to the steps of FIG. 3 is described below with examples.

5. Illustrative Example

FIGS. 4A-4B, 5A-5B, 6, 7, 8A-8C and 9 together illustrate the manner in which secured access to protected resources hosted in one cloud (260) from another cloud (220) is facilitated in one embodiment. Each of the Figures is described in detail below.

According to an aspect, a cloud agent is installed in the cloud node (VM 220-1 or the underlying node such as node 140-4) seeking access to protected resources. A cloud agent represents a software application/module that manages cloud web tokens on the installed cloud node. A cloud agent operates on behalf of applications (such as 225) executing in the cloud node (VM 220-1 or node 140-4) and sends token requests (step 310) to IAP 250 and receives corresponding responses containing the respective cloud web tokens. The cloud agent then forwards the received cloud web tokens to the respective applications, thereby enabling the applications to access the desired protected resources. The manner in which a cloud agent facilitates secured access to protected resources is described below with examples.

Figure 4A:
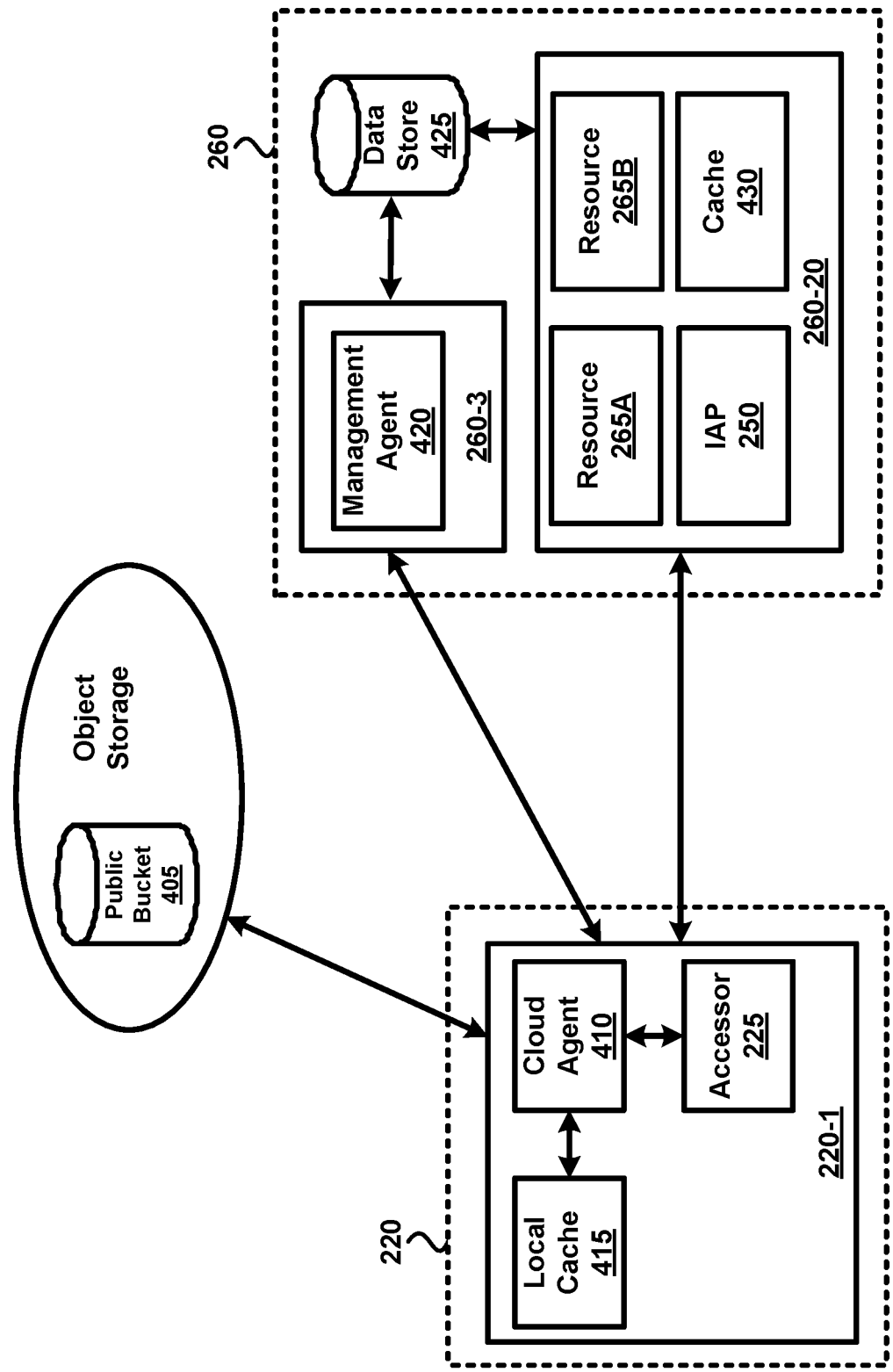
FIG. 4A illustrates the manner in which secured access to protected resources is facilitated by a cloud agent in one embodiment.

FIG. 4A illustrates the manner in which secured access to protected resources is facilitated by a cloud agent in one embodiment. In addition to the blocks of FIG. 2B, the block diagram is shown containing object storage/public bucket 405, cloud agent 410, local cache 415, management agent 420, data store 425 and cache 430. Each of the blocks is described in detail below.

Object storage/public bucket 405 represents a public cloud storing various software applications/modules as corresponding objects. In one embodiment, public bucket 405 maintains different versions of a cloud agent, each version being suitable for installation in a corresponding computing environment.

Cloud agent 410 represents a suitable cloud agent downloaded from public bucket 405 and installed in a cloud node (VM 220-1). After installation, cloud agent 410 communicates with management agent 420 to register itself and a callback URL (universal resource locator) corresponding to cloud agent 410.

Management agent 420 represents a software module that receives registration requests from cloud agents (such as 410), generates a cloud agent identifier (in some embodiments, by interfacing with IAP 250), stores the details of the cloud agent and associated cloud agent identifier and callback URL in data store 425, and provides the cloud agent identifier to the requesting cloud agent (410). Data store 425 represents a non-volatile (persistent) storage facilitating storage and retrieval of data by management agent 420, and may be implemented as a database server or as a file server as described in detail above. After registration, cloud agent 410 may share/send a public encryption key (e.g., RSA) to management agent 420, which in turn stores the received public encryption key in data store 425.

As noted above, cloud agent 410 operates on behalf of applications (such as accessor 225) executing in the cloud node VM 220-1. Specifically, cloud agent 410 and sends token requests to IAP 250 and receives corresponding responses containing the respective cloud web tokens. Cloud agent 310 then stores the received cloud web tokens in local cache 415 and forwards the received cloud web tokens to the respective accessors, thereby enabling the accessors to access the desired protected resources.

Each of local cache 415 and cache 430 represents a volatile storage that is used to maintain cloud web tokens. Specifically, in each cache, each cloud web token is stored associated with a corresponding resource identifier/URL. In alternative embodiments, local cache 415 and cache 430 may be implemented using non-volatile storages such as hard disks within the nodes.

Figure 4B:
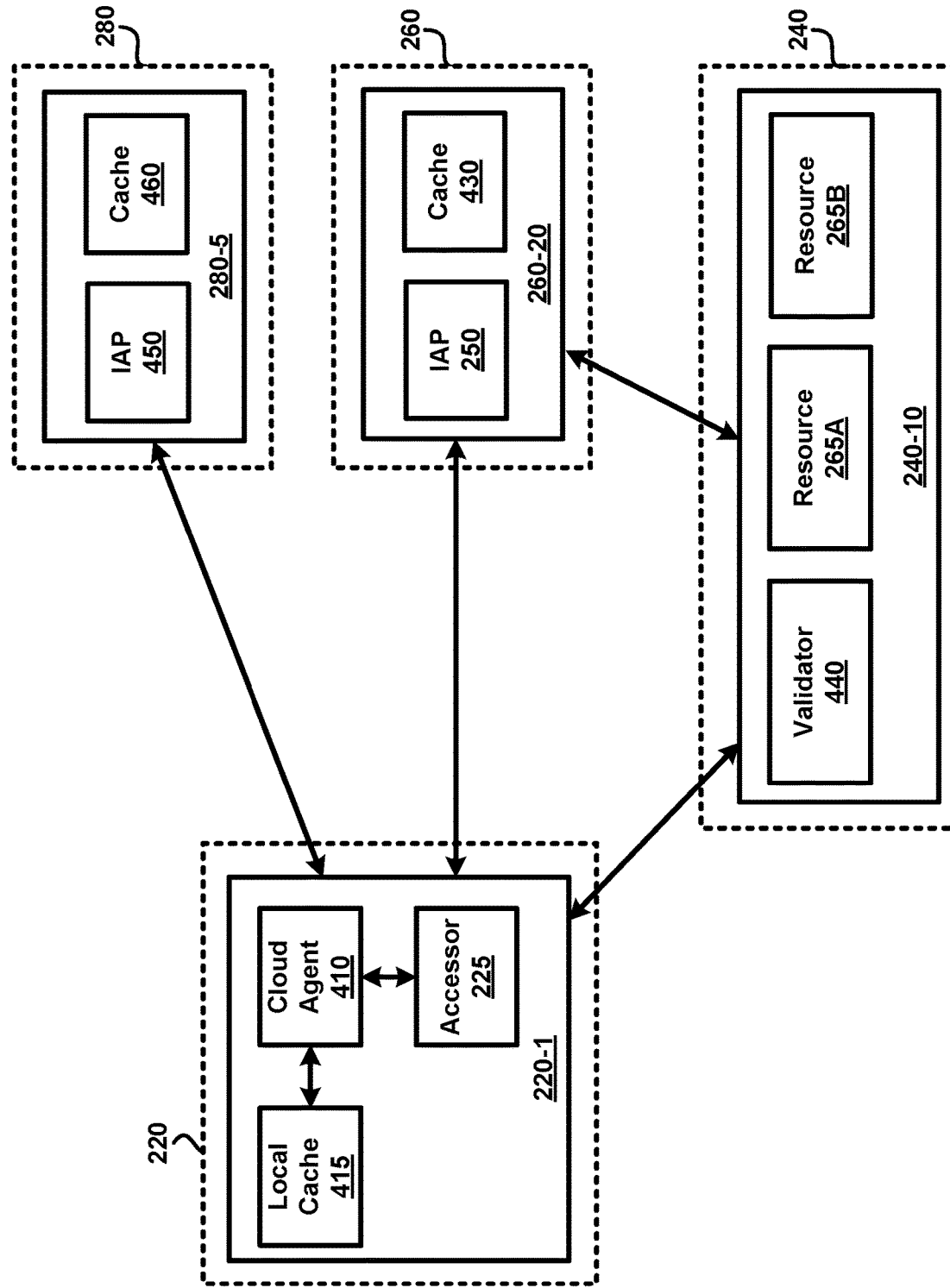
FIG. 4B illustrates the manner in which secured access to protected resources is facilitated by a cloud agent in an alternate embodiment.

FIG. 4B illustrates the manner in which secured access to protected resources is facilitated by a cloud agent in an alternate embodiment. It may be observed that protected resources 265A-265B are shown hosted on a VM/node (VM 24-10) of a different (third) cloud (240) from that of the accessor/cloud node 220-1 and IAP 250. In addition, another identity access provider (IAP) 450 along with a corresponding cache 460 are shown executing in VM 280-5 of cloud 280.

Validator 440 represents a software module that performs the validation of cloud web tokens contained in access requests received for protected resources 265A-265B. Validator 440 may be implemented to interface with front end applications such as web server, load balancer, etc. to intercept the access requests and perform the validation of the cloud web tokens prior to allowing or denying access to the protected resources.

The manner in which the various components of FIGS. 4A and 4B operate to facilitate secured access to protected resources is described below with examples.

6. Accessing a Protected Resource

Figure 5A:
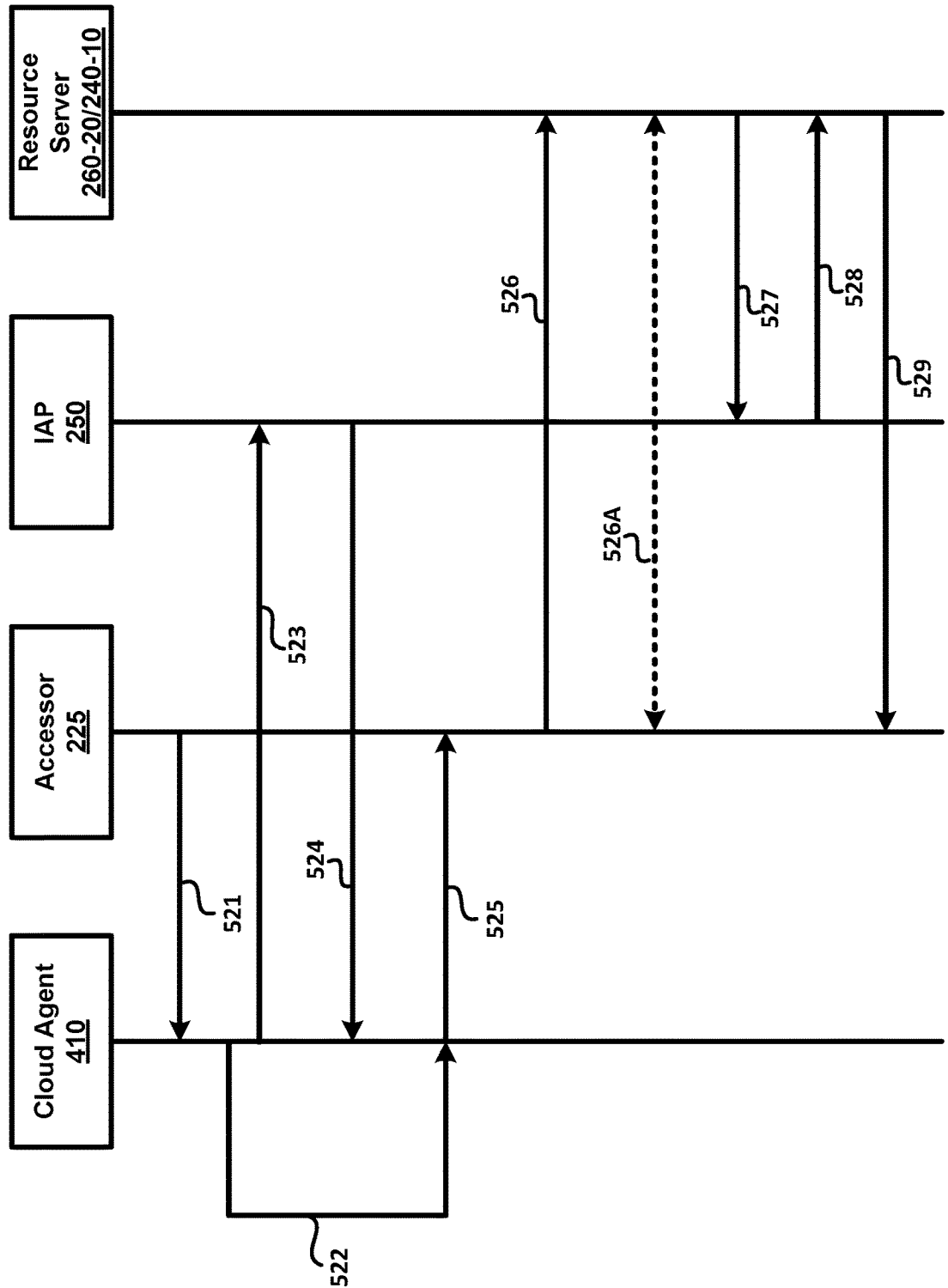
FIG. 5A is a sequence diagram illustrating the manner in which secured access to protected resources is facilitated in one embodiment.

FIG. 5A is a sequence diagram illustrating the manner in which secured access to protected resources is facilitated in one embodiment. In step 521, accessor 225 sends a token request for a protected resource sought to be accessed to cloud agent 410. The token request includes the URL of the protected resource. In step 522, cloud agent 410 checks local cache 415 on whether a cloud web token for the requested resource URL already exists in local cache 415. If such a cloud web token exists, cloud agent 410 forwards the cached cloud web token to accessor 225 in step 525. Alternatively, in step 523, cloud agent 410 sends a token request for a cloud web token to IAP 250.

In step 524, IAP 250 sends a newly generated cloud web token to cloud agent 410. After storing the received cloud web token in local cache 415, cloud agent 410 forwards the received cloud web token to accessor 225 in step 525. In one embodiment, IAP 250 generates the cloud web token, encrypts the cloud web token using the public encryption key (stored in data store 425) corresponding to cloud agent 410 and sends the encrypted cloud token to cloud agent 410. Cloud agent 410 in turn decrypts the encrypted cloud web token using a private encryption key (counterpart to the public encryption key, as is well known, for example in RSA) and provides the decrypted/normal cloud web token to accessor 225 in step 525.

In step 526, accessor 225 sends an access request for the desired protected resource to resource server 260-20/240-10 hosting the protected resource. The access request includes the cloud web token received in step 525 from cloud agent 410. In step 526A, the resource server identifies the specific identity provider (IAP 250 or IAP 450) that generated the cloud web token received as part of the access request. The Upon determining that IAP 250 is the identity provider that generated the cloud web token, the resource server sends the received cloud web token for validation to the identity provider (IAP 250) in step 527. In step 528, the resource server receives data indicating whether the cloud web token is valid or not valid. In step 529, if the cloud web token is indicated to be valid, the resource server allows the accessor (225) to access the protected resource requested (step 380) and denies the access otherwise (step 390). In one embodiment, denying access entails sending an error message with HTTP-401 (Not Authorized) as a response to the access request.

According to an aspect, in the embodiment of FIG. 4B, upon receiving an access request (step 526), validator 440 sends a validation request to IAP 250 containing the cloud web token received in the access request (step 527). Validator 440 then receives from IAP 250, as a response to the validation request (step 528), data indicating whether the cloud web token is valid or not valid. If the cloud web token is indicated to be valid, validator 440 allows the accessor (225) to access the protected resource requested (step 380) and denies the access otherwise (step 390).

Thus, the cloud agent (410) and IAP 250 operate together to facilitate secured access to protected resources. Though such access is secured, it may be desirable that such secured access should also be impervious to any network-based attacks. The manner in which the security in accessing protected resources is further enhanced, is described below with examples.

7. Enhanced Secured Access to Protected Resources

According to an aspect, a secret key is registered associated with each cloud agent (such as 410), with the registered secret key being included as part of the cloud web token. As such, IAP 250 determines that a cloud web token received in an access request is valid only if a secret key contained in the cloud web token matches the secret key associated with the cloud agent and is not valid otherwise. In other words, the usage of the secret key ensures that the token request was forwarded using the cloud agent installed on the same node. The manner in which secret key are created and shared is described below with examples.

Figure 5B:
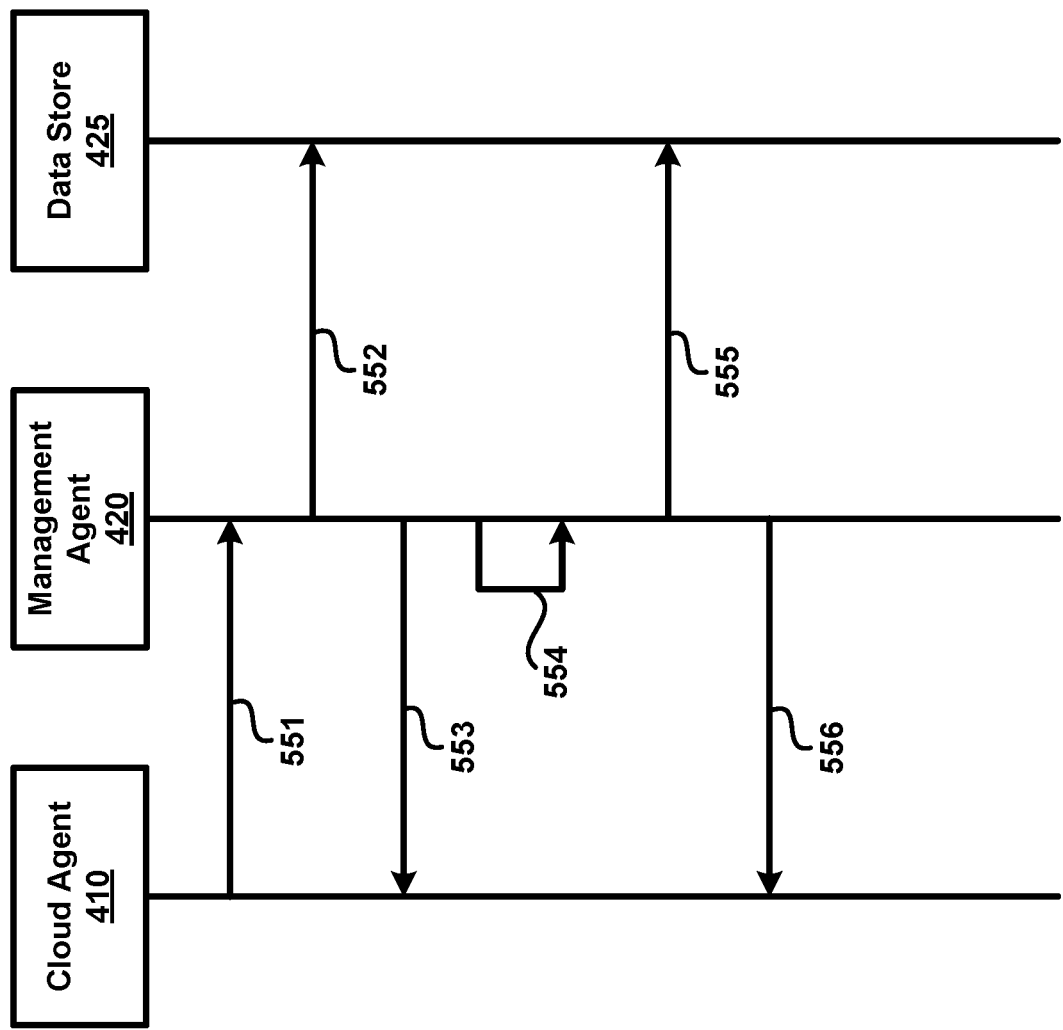
FIG. 5B is a sequence diagram illustrating the manner in which secret keys are created and shared in one embodiment.

FIG. 5B is a sequence diagram illustrating the manner in which secret keys are created and shared in one embodiment. In step 551, cloud agent 410 sends a registration request to management agent 420. Management agent 420 in turn generates a cloud agent identifier noted above for cloud agent 410 and also creates a secret key (a random text/string of characters of any pre-defined length) for the requesting cloud agent (410). Management agent 420 then registers the secret key associated with the cloud agent (410). Registration entails storing in data store 425, the created secret key associated with the cloud agent identifier of the requesting cloud agent in step 552. In step 553, the secret key is provided to cloud agent 410 in one embodiment. However, in alternative embodiments, the secret key is only stored in data store 425 and not provided to cloud agent 410.

In step 554, management agent 420 identifies that the secret key associated with a cloud agent (assumed to be 410 for illustration) is to be modified. Such identification may be based on detecting a network-based attack or a system breach in the node in which the cloud agent is installed. Alternatively, such detection may be performed by one or more entities (e.g., cloud agent 410) of the accessing cloud (220) or the resource cloud (260), with management agent 420 then receiving an indication from the one or more entities that the secret key is to be modified.

In step 555, management agent 420 creates a new secret key and updates the (previous) secret key stored in data store 425 with the new secret key. Management agent 420 then communicates (instep 556) the new secret key to the cloud agent (410) installed in the cloud node (e.g., 220-1).

It may be appreciated that the usage of secret keys in association with the cloud agents installed in the nodes ensures that network-based attacks are made ineffective. Even in the scenario that a cloud web token is compromised, the change of the secret key pro-actively ensures that such compromised cloud web token cannot be used to access protected resources.

In addition, periodic secret key rotation (steps 555 and 556) may be performed at pre-defined duration (e.g., every 15 days) or at specific event (e.g., when a leader node restarts). Such periodic rotation of the secret key ensure that the cloud web tokens generated get rotated/changed periodically. Also, as noted above, a cloud agent or a resource cloud may force a secret key change (in response to detection of an attack) thereby ensuring the rotation of the secret key and correspondingly the generated cloud web tokens.

Thus, the cloud agent (410) and management agent (420) operate together to facilitate more secured access to protected resources. It may be appreciated that in alternative embodiments, management agent 420 may be implemented as part of IAP 250, and accordingly the steps of FIGS. 5A and 5B may be performed by IAP 250 along with the generation and validation of cloud web tokens. The manner in which IAP 250 generates cloud web tokens is described below with examples.

8. Generating Cloud Web Tokens

Figure 6:
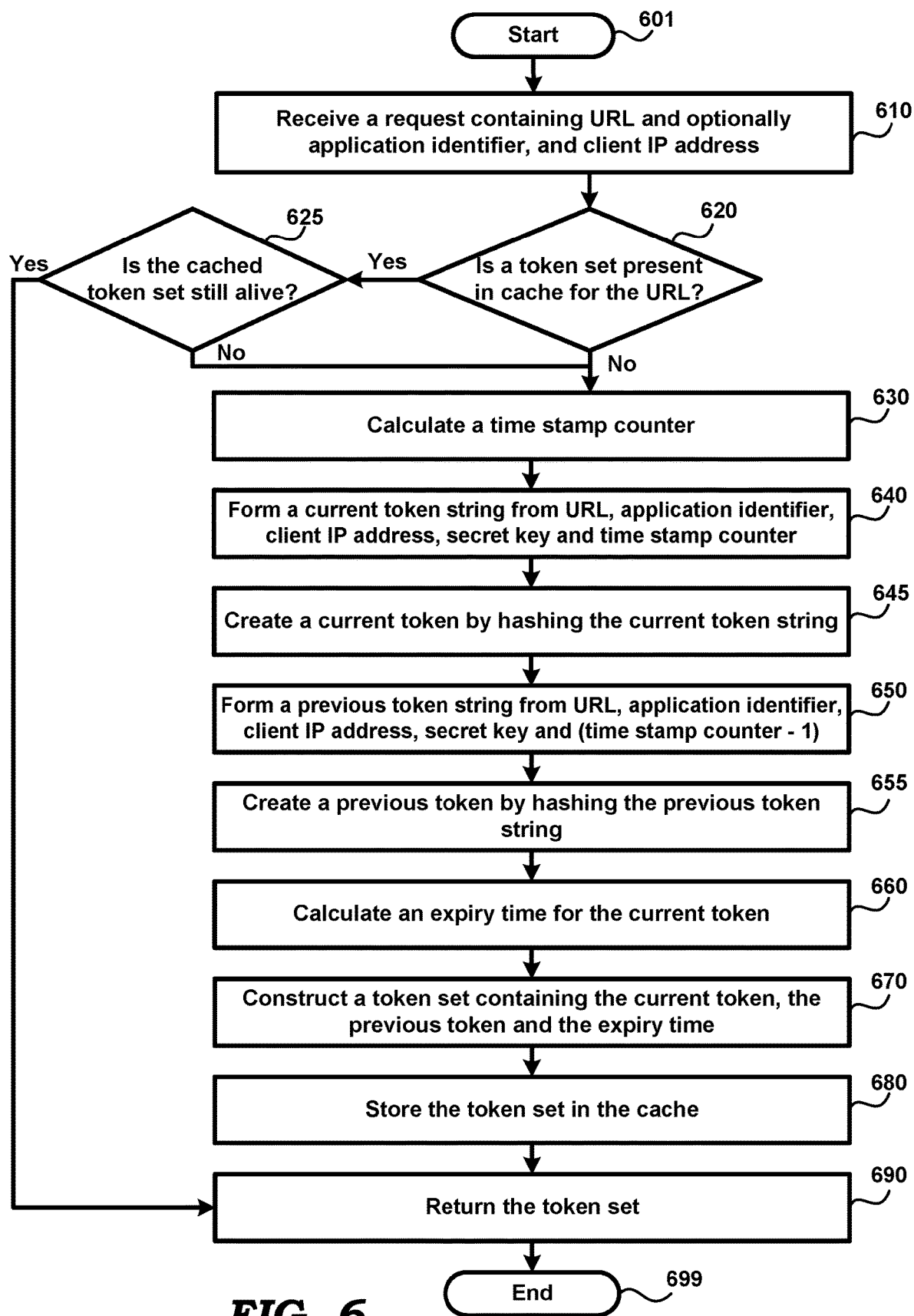
FIG. 6 is a flow chart illustrating the manner in which cloud web tokens are generated according to aspects of the present disclosure.

FIG. 6 is a flow chart illustrating the manner in which cloud web tokens are generated according to aspects of the present disclosure. The flowchart is described with respect to the systems of FIGS. 1, 2A and 2B, in particular IAP 250, merely for illustration. However, many of the features can be implemented in other environments also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 601, in which control immediately passes to step 610.

In step 610, IAP 250 receives a request containing resource URL and optionally client identifier and client IP address. The request is one of a token request containing the resource URL, client identifier and client IP address or an access/validation request containing only the resource URL.

In step 620, IAP 250 checks whether a token set is present in a cache for the resource URL. Each token set contains a current token valid for a current duration and a previous token valid for a previous duration. Each token set is associated with an expiry time indicating a time period after which the token set is no longer alive. Control pass to step 625 if a token set is present and to step 630 otherwise.

In step 625, IAP 250 checks with the cached token set is still alive by checking whether the expiry time associated with the cached token set is less than a current time. Control passes to step 690 if the expiry time is less than the current time (alive) and to step 630 otherwise (not alive).

In step 630, IAP 250 calculates a time stamp counter based on the current time and a fixed duration. According to an aspect, each cloud web token is valid for a fixed duration (TOKEN_LIVE_TIME), which may be set to any desirable value (e.g., 10 minutes, 1 hour, 2 days, etc.). IAP 250 calculates the time stamp counter by dividing the current time in milliseconds by the fixed duration. IAP 250 includes the time stamp counter as part of the generated cloud web token to indicate that the cloud web token is valid up to a time instance specified by the time stamp counter.

It should be noted that the current time in milliseconds is an integer value and counts the number of milliseconds elapsed from a pre-defined time instance (e.g., 1 Jan. 1970 00:00). Accordingly, dividing the current time by the fixed duration results in an integer that counts the number of times the fixed duration has elapsed from the pre-defined time instance).

In step 640, IAP 250 forms a current token string by concatenating the resource URL, application identifier, client IP address, the secret key associated with the requesting cloud agent and the calculated time stamp counter. The secret key may be retrieved from data store 425. In step 645, IAP 250 creates a current (cloud web) token by hashing the current token string. The hashing may be performed in a known way, for example, using MD5 hashing well known in the relevant arts.

In step 650, IAP 250 forms a previous token string by concatenating the resource URL, application identifier, client IP address, secret key and (time stamp counter-1). In step 655, IAP 250 creates a previous (cloud web) token by hashing the previous token string. It may be appreciated that the value of (time stamp counter-1) would be the time stamp counter for the previous duration.

In step 660, IAP 250 calculates an expiry time for the current token. In one embodiment, a current time (in milliseconds) is retrieved and a modulo operation with respect to TOKEN_LIVE_TIME is performed to determine a TIME_ELAPSED. The modulo operation indicates the portion of the fixed duration that has already elapsed. TIME_ELAPSED is then subtracted from TOKEN_LIVE_TIME to determine the delta/difference time remaining in the current duration. The delta time is added to current time to calculate the expiry time for the current token.

In step 670, IAP 250 constructs a token set containing the current token, the previous token and the expiry time. Such construction may entail storing the tokens and expiry time in corresponding fields of a data structure, such as an object, table, etc. In step 680, IAP 250 stores the token set in the cache associated with the resource URL. Such storage enables the cached cloud web token to be identified and retrieved in step 620.

In step 690, IAP 250 returns a token set as a response to the token request. It may be appreciated that the returned token set may be one of a previously cached token set or a newly generated token set. Control passes to step 699, where the flow chart ends.

Thus, IAP 250 generates cloud web tokens based on the identifiers of the protected resources and the identifiers of the application/cloud node seeking access to such resources. As described above, once the cloud web tokens are generated, the cloud web tokens are used in access requests to access desired protected resources. However, prior to allowing/denying access to the protected resources, the cloud web tokens in the access requests need to be checked to determine whether they are valid or not valid. The manner in which the validation of cloud web tokens may be performed is described below with examples.

9. Validating Cloud Web Tokens

Figure 7:
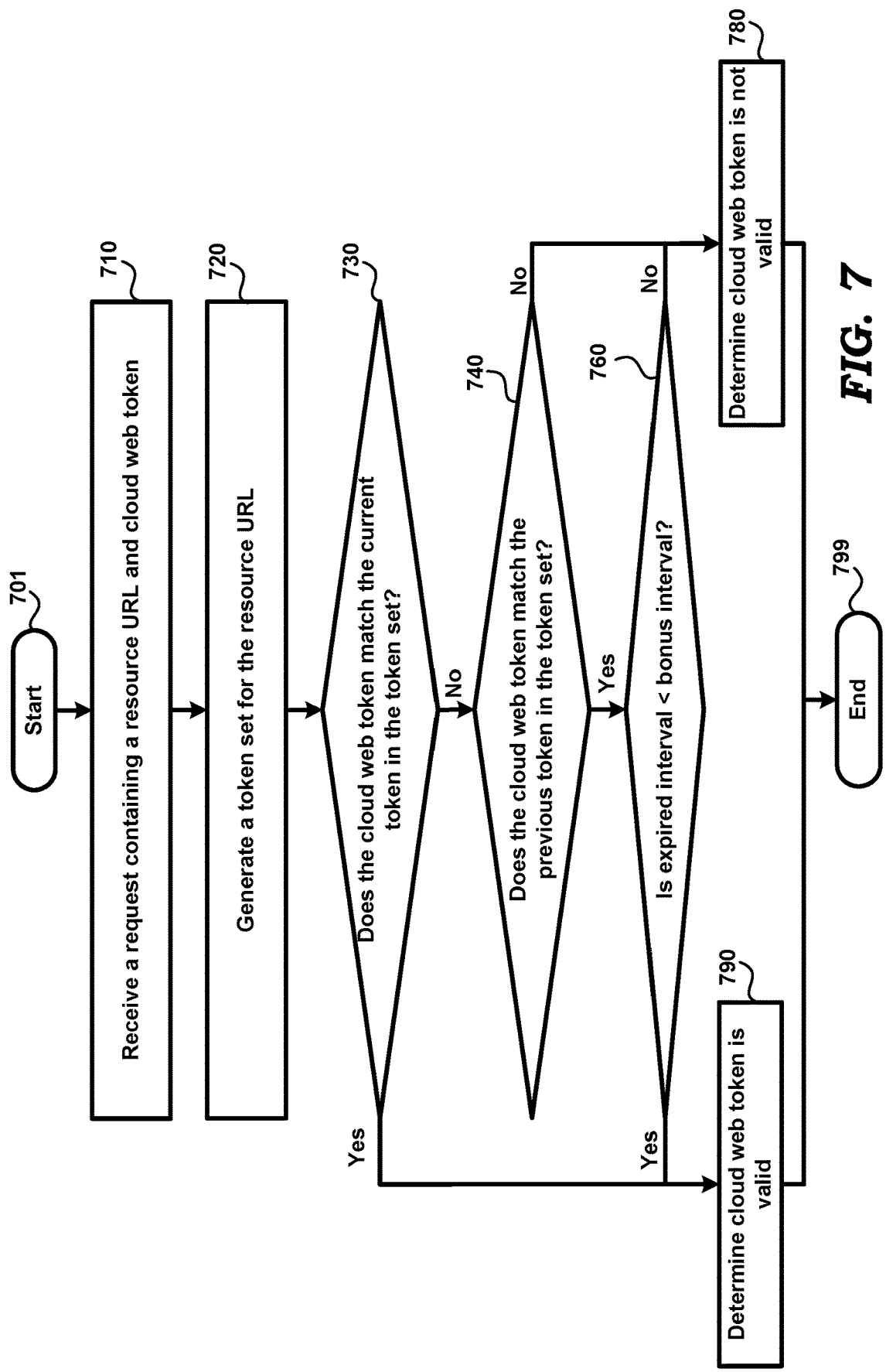
FIG. 7 is a flow chart illustrating the manner in which cloud web tokens are validated according to aspects of the present disclosure.

FIG. 7 is a flow chart illustrating the manner in which cloud web tokens are validated according to aspects of the present disclosure. The flowchart is described with respect to the systems of FIGS. 1, 2A and 2B, in particular IAP 250, merely for illustration. However, many of the features can be implemented in other environments also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 701, in which control immediately passes to step 710.

In step 710, IAP 250 receives a request containing a resource URL and a cloud web token. The request may be one of a validation request received from validator 440 or an access request directly received from accessor 225.

In step 720, IAP 250 generates a token set for the resource URL. It may be appreciated that such generation causes the steps of FIG. 5 to be performed, thereby resulting in a cached token set to be provided as the token set for the resource URL. As noted above, the generated/retrieved token set contains a current token, a previous token and is associated with an expiry time.

In step 730, IAP 250 checks whether the received cloud web token matches (is the same as) the current token in the token set. Control passes to step 790 if the received cloud web token matches the current token and to step 740 otherwise.

In step 740, IAP 250 checks whether the received cloud web token matches (is the same as) the previous token in the token set. Control passes to step 760 if the received cloud web token matches the previous token and to step 780 otherwise.

In step 760, IAP 250 checks whether an expired interval is less than a bonus interval (BONUS_TIME_IN_MILIS). In other words, it is checked whether the received cloud web token (matching the previous token) has expired within a bonus interval prior to a time instance at which the access request was received. As such, the expired interval is calculated as the number of milliseconds between the time instance at which the access request was received and start of the current duration. The bonus interval ensures that any previous (cloud web) tokens was still valid for a few milliseconds after their actual expiry time. Any convenient bonus interval such as 5 seconds, 1 minute, etc. may be pre-defined/pre-configured. Control passes to step 790 if the expired interval is less than the bonus interval and to step 780 otherwise.

In step 780, IAP 250 determines that the received cloud web token is not valid. In the scenario that the received request is a validation request, IAP 250 sends a data (indicating not valid) as a response to the validation request. In the scenario that the received request is an access request, IAP 250 denies access to the protected resource (corresponding to the resource URL) based on the determination of not valid. Control passes to step 799, where the flow chart ends.

In step 790, IAP 250 determines that the received cloud web token is valid. In the scenario that the received request is a validation request, IAP 250 sends a data (indicating valid) as a response to the validation request. In the scenario that the received request is an access request, IAP 250 allows access to the protected resource (corresponding to the resource URL) based on the determination of valid. Control passes to step 799, where the flow chart ends.

Thus, IAP 250 validates cloud web tokens received as part of validation/access requests. It may be appreciated that any suitable data format may be used for the cloud web token. Some example data used for facilitating secured access to protected resources is described below with examples.

10. Sample Data

Figures 8A, 8B:
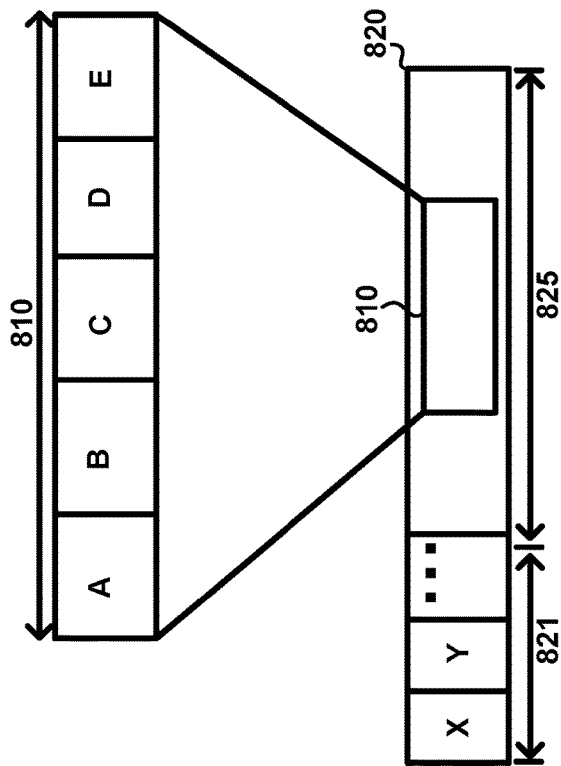
FIG. 8A illustrates the various data formats employed during secured access of protected resources in one embodiment.
FIG. 8B illustrates the manner in which cloud web tokens are stored in a cache in one embodiment.

FIG. 8A illustrates the various data formats employed during secured access of protected resources in one embodiment. Data format 810 depicts the format of a cloud web token in one embodiment. 810-A is an URL of the resource (resource identifier), 810-B is an identifier associated with the application service (application identifier), 810-C is a public IP address of the cloud node (node identifier), 810-D is a secret key associated with the cloud agent (410) installed in the cloud node (220-1) and 810-E is a time stamp counter.

It should be noted that the value in field 810-D is obtained from data store 425 as the secret key corresponding to cloud agent 410. As such, validation of the cloud web token ensures that a secret key contained in a received cloud web token matches the secret key associated with the cloud agent (stored in data store 425).

Data format 820 depicts the format of a TCP/IP packet sent as a part of the access request. Packet 820 is shown containing a header 821 and a payload 825. 821-X is a source URL/IP address identifying the cloud node sending the request, while 821-Y is a destination URL/IP address identifying the resource sought to be accessed. Payload 825 is shown containing a cloud web token 810, which in turn includes the fields 810-A through 810-E described above.

As noted above, the cloud web tokens may be stored associated with corresponding resource identifiers in cache 430/local cache 415 of FIG. 4A. The manner in which the cloud web tokens may be stored in a cache is described below with examples.

FIG. 8B illustrates the manner in which cloud web tokens are stored in a cache in one embodiment. Though shown in the form of a table, the cache may be maintained according to other data formats (such as extensible markup language (XML), etc.) and/or using other data structures (such as lists, trees, etc.), as will be apparent to one skilled in the relevant arts by reading the disclosure herein.

In cache table 840, column 851 specifies the corresponding cloud web tokens generated for accessing protected resources, while column 852 specifies the corresponding resource identifiers (URLs) of the protected resources. Thus, each row in cache table 840 indicates an association between a cloud web token and a respective resource identifier. The determination of the cloud web token corresponding to a received resource identifier may be performed by identifying a row in cache table 840 containing the received resource identifier, and then picking the cloud web token in the identified row as the corresponding cloud web token.

Thus, cloud web tokens may be stored in a cache such as cache 430 or local cache 415 of FIG. 4A. The description is continued with respect to the various timelines associated with cloud web tokens.

Figure 8C:
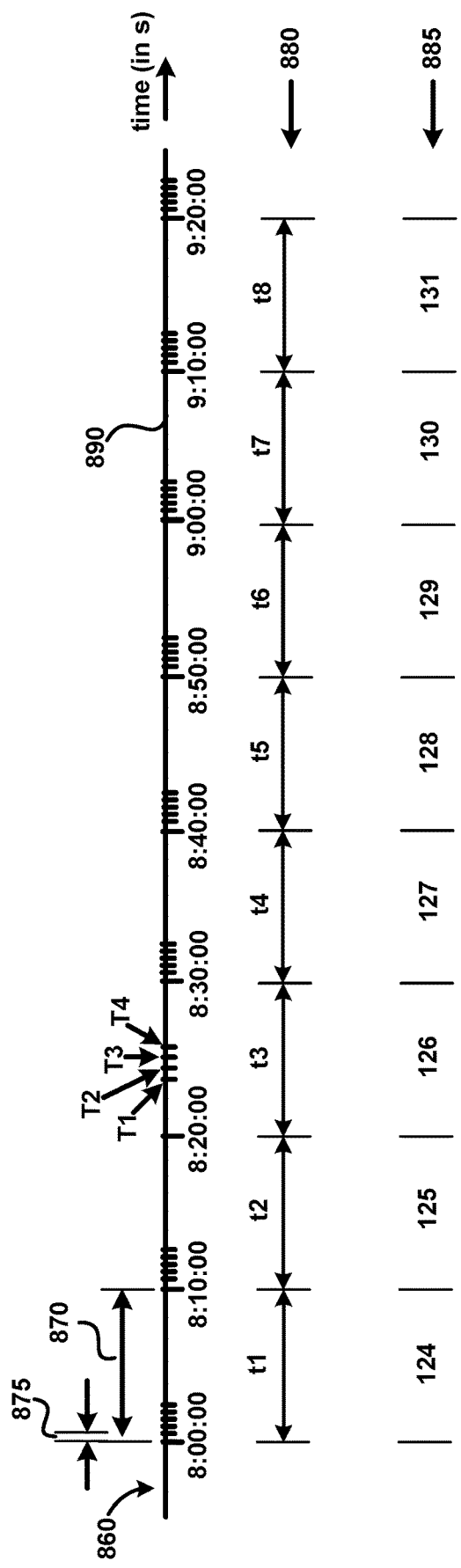
FIG. 8C depicts various timelines associated with cloud web tokens in one embodiment.

FIG. 8C depicts various timelines associated with cloud web tokens in one embodiment.

Specifically, timeline 860 depicts the operation of IAP 250 processing various requests. For illustration, timeline 860 is shown in seconds (as indicated by the 24-hour format "8:00:00"). Duration 870 represents a fixed duration ((TOKEN_LIVE_TIME) for which each cloud web token is valid, while duration 875 represents the bonus interval (BONUS_TIME_IN_MILIS). The fixed duration is assumed to be 10 minutes, while the bonus interval is assumed to be 1 minute of illustration.

Timeline 860 is accordingly shown having 8 fixed durations (t1 to t8) as indicated by 880. The time stamp counters calculated for the fixed durations (t1-t8) are indicated in 885. It may be observed that the time stamp counter is an increasing sequence of values, with the time stamp counter of each current duration being 1 more than the time stamp counter for the previous duration.

T1, T2, T3 and T4 indicate token requests received in duration t3. It should be noted that all cloud web tokens generated in response to the token requests T1, T2, T3 and T4 will have the time stamp counter as 126 and will expire at "8:30:00". However, in view of the operation of the validation flowchart of FIG. 7, all the cloud web tokens will be valid up to "8:31:00" (that is "8:30:00"+bonus interval of 1 minute).

When a validation/access request is received at time instance 890 in duration t7, IAP 250 compares the received cloud web token with a current token valid for current duration t7 and a previous token valid for previous duration t6. IAP 250 determines that the received cloud web token is valid (a) if the received cloud web token matches the current token (that is, the received cloud web token was generated during t7) or (b) if the received cloud web token matches the previous token and an expired interval between the first time instance (890) and start of the current duration ("9:00:00") is less than the bonus interval (875). For (b), IAP 250 checks if the received cloud web token has expired (time instance "9:00:00") within a bonus interval (875) prior to time instance 890.

It may be appreciated that by having the bonus interval and comparing the received cloud web token with the previous web token, secured access to protected resources is allowed for all legitimate requests (e.g., those received from accessor 225) without any delays. In prior approaches, delays used to exist as after the expiry of a previous token, an accessor is required to obtain a current token before sending any access requests. On the other hand, according to aspects of the present disclosure, access requests containing the previous tokens can continued to be sent and protected resources accessed during the bonus interval, during which the current token can be obtained from IAP 250. The manner in which IAP 250 may be implemented is described below with examples.

11. Example Implementation

Figure 9:
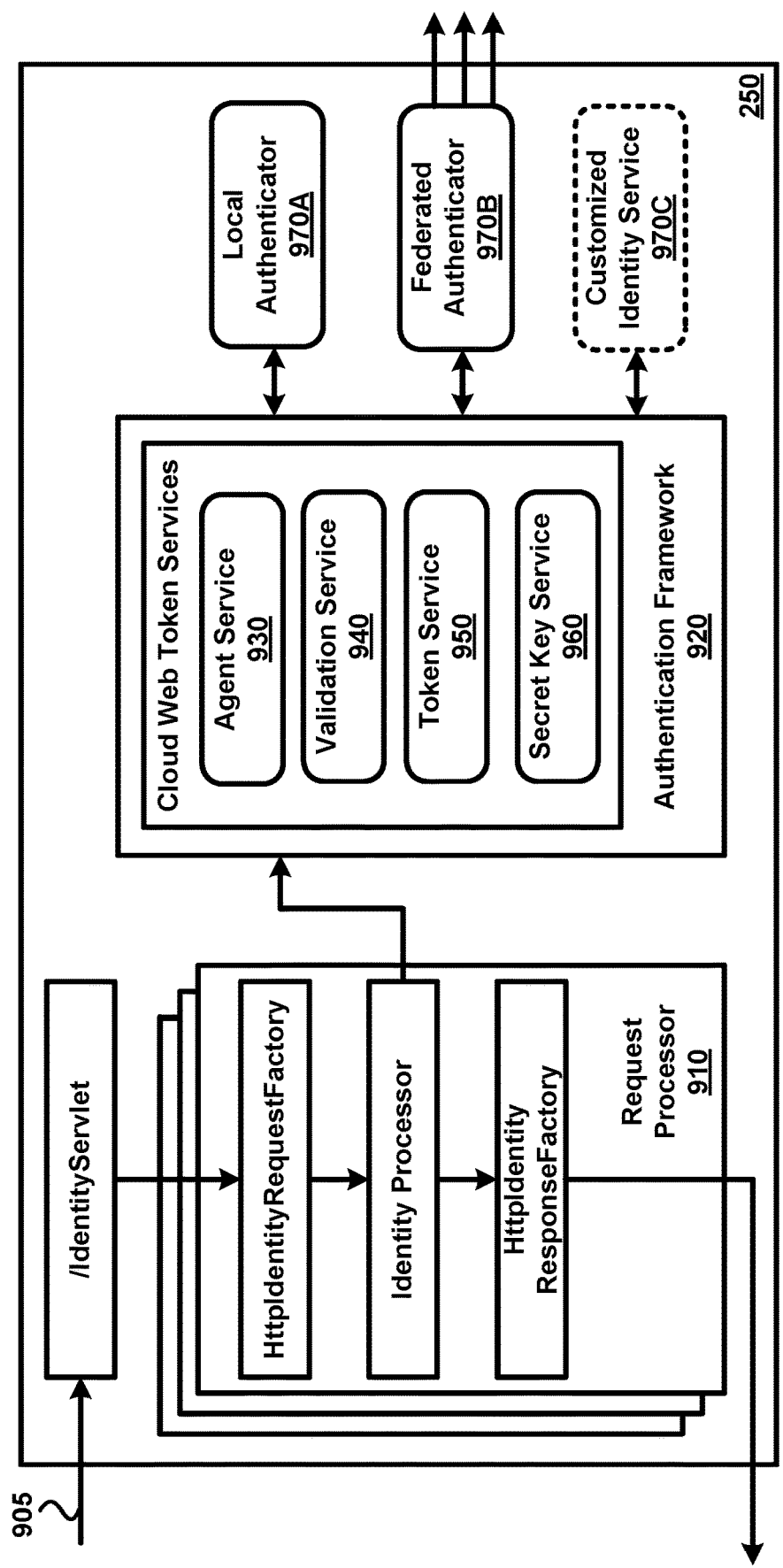
FIG. 9 is a block diagram illustrating the manner in which an identity access provider is implemented in one embodiment

FIG. 9 is a block diagram illustrating the manner in which an identity access provider (250) is implemented in one embodiment. Identity provider 900 represents a system implemented as part of an IAMaaS (Identity Access Management as a Service). Identity servlet receives authentication requests via path 905 and changes them to HTTPIdentityRequest and forwards the requests to request processor 910. Request processor 910 generates identity requests corresponding to the received requests and forwards them to authentication framework 920, which performs the appropriate authentication (and authorizations). Request processor 910 receives an identity response from authentication framework 920, changes them to HTTPIdentityResponse and sends the identity response as corresponding responses to the authentication requests (via path 905).

Each of authenticators 970A-970C represent a corresponding authentication module that is capable of authenticating user data received in authentication requests. Each authenticator may use internal or external data for the performance of the authentication. For example, local authenticator 970A may maintain local data (not shown) which specifies the access rights of various accessors (users or application/data services). In response to receiving a request, local authentication 970A may inspect the local data to determine whether the authentication request is to be allowed or denied. Alternatively, federated authenticator 970B may communicate with an external system for the performance of the authentication.

Cloud web token services represent a set of services implemented as an extension of authentication framework 920. The cloud web token services may be associated with specific types of authentication requests in authentication framework 920. When a specific type is received, authentication framework 920 may invoke the appropriate cloud web token service.

Agent service 930 represents a management service that provides the features of management agent 420 noted above. Specifically, agent service 930 receives registration requests from cloud agents, performs the registrations, and provides cloud agent identifiers to the registered cloud agents.

Secret key service 960 generates secret keys for the cloud agents and forwards the secret keys to the corresponding cloud agents. Upon detecting a scenario that requires a secret key associated with a cloud agent to be modified, secret key service 960 generates a new secret key, associates the new secret key with the cloud agent, and communicates the new secret key to the cloud agent.

Token service 950 generates cloud web tokens for accessing protected resources. As noted above, each cloud web token includes at least the resource URL, an application identifier associated with the application service (requesting access) and a node identifier (client IP address) of a cloud node on which the application service is operative. As further noted above, in one embodiment, token server 950 generates a token set containing a current token, a previous token and an expiry time associated with the current token.

Validation service 940 validates access requests based on the cloud web tokens contained in the requests. As noted above, validation server 940 retrieves a stored cloud web token associated with a resource identifier/URL in an access request, compares the stored cloud web token with a cloud web token in the access request and determines whether the cloud web token in the access request is valid (when a match is present) or not valid (otherwise).

It should be further appreciated that the features described above can be implemented in various embodiments as a desired combination of one or more of hardware, software, and firmware. The description is continued with respect to an embodiment in which various features are operative when the software instructions described above are executed.

12. Digital Processing System

FIG. 10 is a block diagram illustrating the details of digital processing system (1000) in which various aspects of the present disclosure are operative by execution of appropriate executable modules. Digital processing system 1000 may correspond to identity access providers 250/450 or nodes 140/170/190 implementing VMs.

Digital processing system 1000 may contain one or more processors such as a central processing unit (CPU) 1010, random access memory (RAM) 1020, secondary memory 1030, graphics controller 1060, display unit 1070, network interface 1080, and input interface 1090. All the components except display unit 1070 may communicate with each other over communication path 1050, which may contain several buses as is well known in the relevant arts. The components of FIG. 10 are described below in further detail.

CPU 1010 may execute instructions stored in RAM 1020 to provide several features of the present disclosure. CPU 1010 may contain multiple processing units, with each processing unit potentially being designed for a specific task. Alternatively, CPU 1010 may contain only a single general-purpose processing unit.

RAM 1020 may receive instructions from secondary memory 1030 using communication path 1050. RAM 1020 is shown currently containing software instructions constituting shared environment 1025 and/or other user programs 1026 (such as other applications, DBMS, etc.). In addition to shared environment 1025, RAM 1020 may contain other software programs such as device drivers, virtual machines, etc., which provide a (common) run time environment for execution of other/user programs.

Graphics controller 1060 generates display signals (e.g., in RGB format) to display unit 1070 based on data/instructions received from CPU 1010. Display unit 1070 contains a display screen to display the images defined by the display signals. Input interface 1090 may correspond to a keyboard and a pointing device (e.g., touch-pad, mouse) and may be used to provide inputs. Network interface 1080 provides connectivity to a network (e.g., using Internet Protocol), and may be used to communicate with other systems connected to the networks.

Secondary memory 1030 may contain hard drive 1035, flash memory 1036, and removable storage drive 1037. Secondary memory 1030 may store the data (e.g., data shown in FIGS. 8A-8B) and software instructions (e.g., for performing the actions of FIGS. 3, 5A-5B, 6 and 7 for implementing the various aspects of the present disclosure), which enable digital processing system 1000 to provide several features in accordance with the present disclosure. The code/instructions stored in secondary memory 1030 may either be copied to RAM 1020 prior to execution by CPU 1010 for higher execution speeds, or may be directly executed by CPU 1010.

Some or all of the data and instructions may be provided on removable storage unit 1040, and the data and instructions may be read and provided by removable storage drive 1037 to CPU 1010. Removable storage unit 1040 may be implemented using medium and storage format compatible with removable storage drive 1037 such that removable storage drive 1037 can read the data and instructions. Thus, removable storage unit 1040 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 1040 or hard disk installed in hard drive 1035. These computer program products are means for providing software to digital processing system 1000. CPU 1010 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 1030. Volatile media includes dynamic memory, such as RAM 1020. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1050. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

13. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

What is claimed is:

1. A method for facilitating secured access to protected resources, said method comprising:
   receiving, by an identity and access provider (IAP) from an application service operating on a cloud node of a plurality of cloud nodes in a first cloud, a token request to access a protected resource hosted on a second cloud;
   generating, by said IAP, a cloud web token comprising a resource identifier of said protected resource, an application identifier associated with said application service and a node identifier of said cloud node, wherein said node identifier uniquely identifies the requesting cloud node in said plurality of nodes;
   sending, by said IAP, said cloud web token to the requesting cloud node as a response to said token request;
   receiving, by said IAP, from said application service, an access request to access said protected resource, said access request containing said resource identifier and said cloud web token that was provided by said IAP;
   checking whether said cloud web token contained in said access request is valid for said resource identifier by retrieving from a storage, a stored cloud web token associated with said resource identifier and comparing said cloud web token contained in said access request with said stored cloud web token to confirm that said cloud web token contained in said access request includes said resource identifier, said application identifier and said node identifier; and
   allowing access to said protected resource when said cloud web token contained in said access request is determined to be valid, and denying access to said protected resource otherwise.

2. The method of claim 1, wherein said resource identifier is an URL (Uniform resource locator) of said protected resource and said node identifier is a public IP (Internet Protocol) address of said cloud node, whereby said cloud web token contained in said access request includes said URL and said public IP address.

3. The method of claim 2, wherein said storage is a cache, said method further comprising storing in said cache, after said generating, said cloud web token associated with said resource identifier, wherein said checking comprises:
   determining that said access cloud web token contained in said access request includes said resource identifier, said application identifier and said node identifier and is valid if said cloud web token contained in said access request matches said stored cloud web token and is not valid otherwise.

4. The method of claim 3, wherein said receiving receives said access request at a first time instance, wherein said comparing compares said cloud web token contained in said access request with a current token valid for a current duration and a previous token valid for a previous duration prior to said current duration, wherein said determining determines that said cloud web token contained in said access request is valid (a) if said cloud web token contained in said access request matches said current token or (b) if said cloud web token contained in said access request token matches said previous token and if said cloud web token contained in said access request has expired within a bonus interval prior to said first time instance.

5. The method of claim 4, further comprising:

calculating a time stamp counter based on a current time and a fixed duration; and including said time stamp counter as part of each cloud web token to indicate that the cloud web token is valid up to a time instance specified by said time stamp counter, wherein said checking determines that said cloud web token contained in said access request is valid if a timestamp counter contained in said cloud web token contained in said access request also matches the time stamp counter calculated for said first time instance and is not valid otherwise.

6. The method of claim 2, further comprising:

installing a cloud agent in said cloud node, wherein said receiving receives said token request from said cloud agent on behalf of said application service;

registering a secret key associated with said cloud agent;

including said secret key as part of said cloud web token, wherein said checking determines that said cloud web token contained in said access request is valid if a secret key contained in said cloud web token contained in said access request also matches said secret key associated with said cloud agent and is not valid otherwise.

7. The method of claim 6, further comprising:

identifying that said secret key associated with said cloud agent is to be modified;

updating said secret key with a new secret key for said cloud agent; and communicating said new secret key to said cloud agent installed in said cloud node.

8. The method of claim 2, wherein said IAP is implemented external to said second cloud, wherein said checking comprises:

sending to said IAP, a validation request containing said cloud web token contained in said access request; and receiving, as a response to said validation request, data indicating whether said cloud web token contained in said access request is valid or not valid.

9. A non-transitory machine-readable medium storing one or more sequences of instructions forming an identity and access provider (IAP), wherein execution of said one or more instructions by one or more processors contained in a digital processing system cause said digital processing system to perform the actions of:

maintaining, by said IAP in a storage, a set of cloud web tokens and a set of resource identifiers of respective protected resources, each cloud web token being associated with a corresponding resource identifier of a respective protected resource;

wherein each cloud web token is generated by said IAP in response to a token request received from a corresponding application service operating on a cloud node of a plurality of cloud nodes in a first cloud, said token request to access a protected resource hosted on a second cloud, wherein each cloud web token comprises said corresponding resource identifier of said protected resource, an application identifier associated with said corresponding application service and a node identifier of a corresponding requesting cloud node of said plurality of nodes, wherein said node identifier uniquely identifies said corresponding requesting cloud node in said plurality of nodes;

receiving, by said IAP, a request containing a resource identifier and a cloud web token that was provided by IAP;

retrieving, by said IAP, from said storage, a stored cloud web token associated with said resource identifier;

checking, by said IAP, whether said cloud web token contained in said request includes said resource identifier, said application identifier and said node identifier by comparing said cloud web token contained in said request with said stored cloud web token; and determining, by said IAP, that said cloud web token contained in said request is valid if said cloud web token contained in said request includes said resource identifier, said application identifier and said node identifier and is not valid otherwise.

10. The non-transitory machine-readable medium of claim 9, wherein each resource identifier is an URL (Uniform resource locator) of a respective protected resource and each node identifier is a public IP address of a respective cloud node, whereby said cloud web token contained in said request includes said URL and said public IP address.

11. The non-transitory machine-readable medium of claim 10, wherein each cloud web token of said set of cloud web tokens is stored in the form of a corresponding first string, wherein said cloud web token contained in said request is received in the form of a second string, wherein said comparing compares said second string with said first string of said stored cloud web token for a match, wherein said receiving receives said request at a first time instance, wherein said comparing compares said cloud web token contained in said request with a current token valid for a current duration and a previous token valid for a previous duration prior to said current duration, wherein said determining determines that said cloud web token contained in said request is valid (a) if said cloud web token contained in said request matches said current token or (b) if said cloud web token contained in said request matches said previous token and if said cloud web token contained in said request has expired within a bonus interval prior to said first time instance.

12. The non-transitory machine-readable medium of claim 10, wherein said request is a validation request, further comprising one or more instructions for sending, as a response to said validation request, data indicating whether said cloud web token contained in said validation request is valid or not valid.

13. The non-transitory machine-readable medium of claim 10, wherein said request is received from said corresponding cloud node as part of an access request for a protected resource, further comprising one or more instructions for allowing access to said protected resource if said cloud web token contained in said request is determined to be valid, and denying access to said protected resource otherwise.

14. The non-transitory machine-readable medium of claim 9, wherein each cloud web token includes a corresponding secret key registered for a respective cloud agent installed on a cloud node.

15. The non-transitory machine-readable medium of claim 9, wherein each cloud web token includes a corresponding time stamp counter indicating a time instance up to which the cloud web token is valid.

16. A digital processing system comprising:
a random access memory (RAM) to store instructions for facilitating secured access to protected resources; and
one or more processors to retrieve and execute the instructions, wherein execution of the instructions causes the digital processing system to perform the actions of:
sending, to an identity and access provider (IAP), from an application service operating in said digital processing system, a token request to access a protected resource hosted on a second cloud,
wherein said IAP generates and sends back to said digital processing system, a cloud web token comprising a resource identifier of said protected resource, an application service identifier associated with said application service and a node identifier of said digital processing system, wherein said node identifier uniquely identifies said digital processing system;
receiving, from said IAP in response to said token request, said cloud web token; and
sending, to said IAP from said application service, an access request to access said protected resource, said access request containing said resource identifier along with said cloud web token provided by said IAP,
wherein said IAP determines that said cloud web token contained in said access request is valid for said resource identifier by retrieving from a storage, a stored cloud web token associated with said resource identifier and comparing said cloud web token contained in said access request with said stored cloud web token to confirm that said cloud web token contained in said access request includes said resource identifier, said application identifier and said node identifier; and
accessing said protected resource based on the determination that said cloud web token contained in said access request is valid.

17. The digital processing system of claim 16, wherein said resource identifier is an URL (Uniform resource locator) of said protected resource and said node identifier is a public IP address of said cloud node, whereby said cloud web token contained in said access request includes said URL and said public IP address.

18. The digital processing system of claim 17, further performing the actions of:
installing a cloud agent, wherein said sending sends said token request from said cloud agent on behalf of said application service;
registering said cloud agent with a management agent; and
receiving from said management agent, a secret key associated with said cloud agent.

19. The digital processing system of claim 18, wherein said cloud web token includes said secret key registered for said respective cloud agent.

20. The digital processing system of claim 16 wherein said cloud web token includes a time stamp counter indicating a time instance up to which said cloud web token is valid.

* * * * *